United States Patent [19]

Barzda

[11] 4,111,602

[45] Sep. 5, 1978

[54] DEPLOYABLE ROTOR

[75] Inventor: Justin J. Barzda, Windsor, Conn.

[73] Assignee: The United States of America as represented by the Secretary of the Navy, Washington, D.C.

[21] Appl. No.: 764,124

[22] Filed: Jan. 31, 1977

Related U.S. Application Data

[62] Division of Ser. No. 664,714, Mar. 8, 1976, Pat. No. 4,017,043.

[51] Int. Cl.$^2$ ............................................. B64C 27/72
[52] U.S. Cl. .................................. 416/89; 416/134 A; 416/142
[58] Field of Search ............... 416/134 A, 140 A, 142, 416/141, 87–89

[56] References Cited

U.S. PATENT DOCUMENTS

| | | | |
|---|---|---|---|
| 2,282,077 | 5/1942 | Moore | 416/89 |
| 2,415,421 | 2/1947 | Filippis | 416/89 |
| 2,990,149 | 6/1961 | Samms | 416/142 X |
| 3,292,711 | 12/1966 | Peterson | 416/134 A |
| 3,297,094 | 1/1967 | Kisovec | 416/89 |
| 3,700,352 | 10/1972 | Gorndt | 416/141 |

FOREIGN PATENT DOCUMENTS

| | | | |
|---|---|---|---|
| 799,235 | 6/1936 | France | 416/88 |
| 931,199 | 2/1948 | France | 416/89 |
| 934,336 | 5/1948 | France | 416/141 |
| 580,793 | 9/1946 | United Kingdom | 416/88 |
| 872,359 | 7/1961 | United Kingdom | 416/134 |

*Primary Examiner*—Everette A. Powell, Jr.
*Attorney, Agent, or Firm*—R. S. Sciascia; Henry Hansen; William J. Iseman

[57] ABSTRACT

A deployable stowed rotor having a rotor hub to which a pair of telescoping rotor blades are connected is foldable into a package suitable for stowage prior to use. When the rotor is deployed, for example, as a lifting device for an ejection seat, positive preconing of the blades is provided by a spreading link arrangement connected to a drogue chute. Further coning during rotor spin-up is synchronized by intermeshed gears provided at respective one ends of the blades attached to the hub by teeter link hinges. Rotor speed is automatically regulated by a governing spring formed in conjunction with a helical spline arrangement between each of the blades and the hub and which varies the pitch of the spinning blades according to rotational velocity.

4 Claims, 12 Drawing Figures

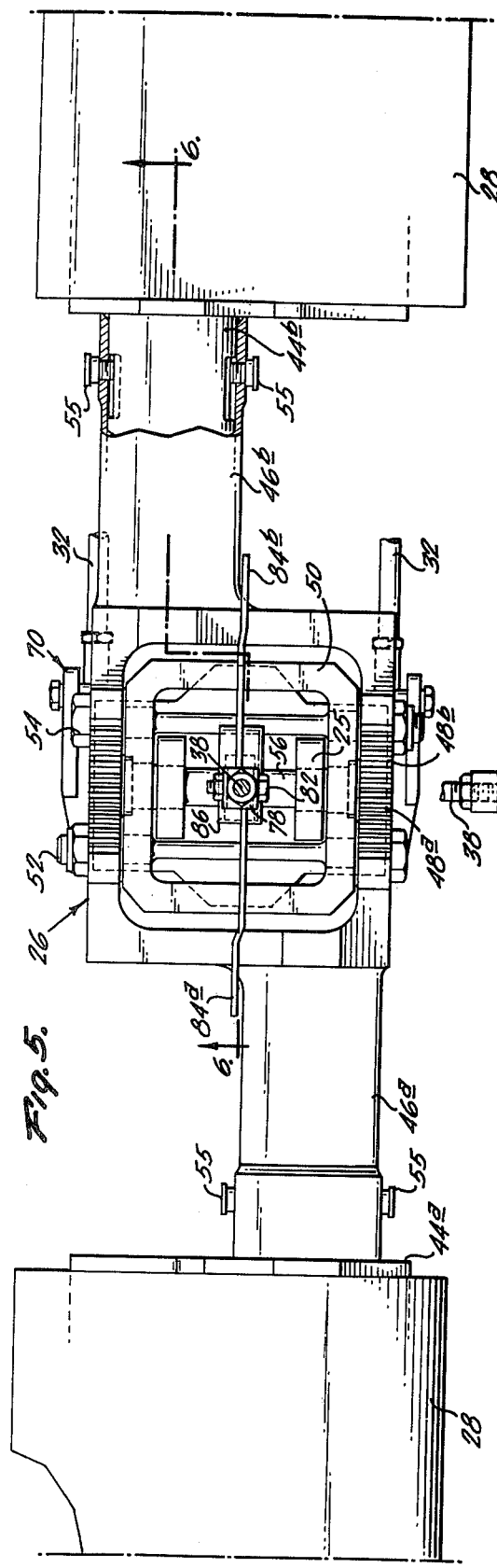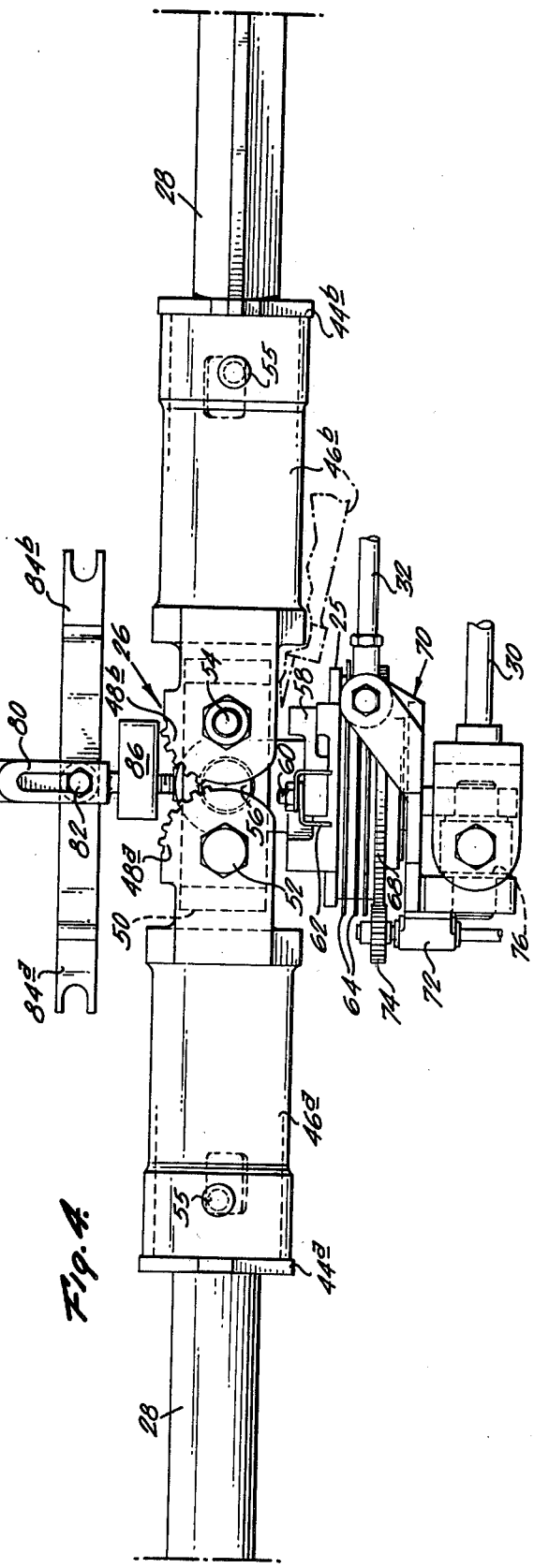

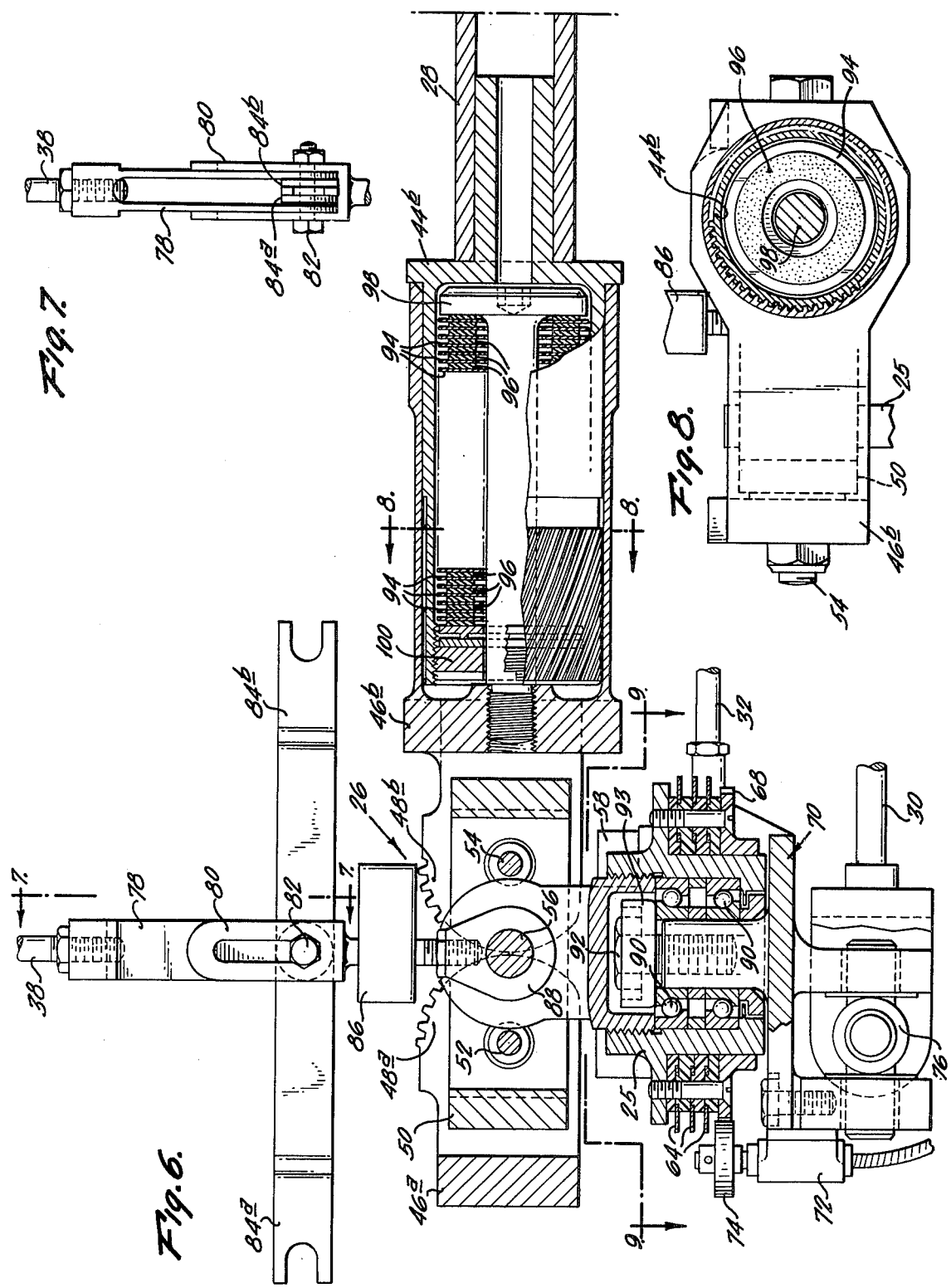

DEPLOYABLE ROTOR

STATEMENT OF GOVERNMENT INTEREST

The invention described herein may be manufactured and used by or for the Government of the United States of America for governmental purposes without the payment of any royalties thereon of therefor.

CROSS-REFERENCE TO RELATED APPLICATION

This is a division of application Ser. No. 664,714, filed on Mar. 8, 1976, now U.S. Pat. No. 4,017,043, issued Apr. 12, 1977.

BACKGROUND OF THE INVENTION

This invention relates generally to the field of aerodynamic lifting rotors and, more particularly, is concerned with a rotor that is deployed from a stowed condition to a flight condition when the need arises.

The use of lift generating rotors to retard the descent rate of aerodynamic or non-aerodynamic bodies such as space vehicles or ejection seats has been known for some time. A rotor system of this type is frequently capable of being folded into a configuration permitting storage prior to use. When the rotor is called upon to function, it is pulled from its stowed position and deployed with the aid of other devices such as drogue chutes, explosive actuators or energy storage reservoirs.

In the simpler recovery systems, the rotor is not driven by an auxiliary power supply but instead relies upon the relative flow of air through the rotor system to produce and lift, sometimes referred to drag in this environment, to retard the descent rate of the vehicle.

Three problems encountered in the deployment of a non-powered rotor are the initial deployment and positive preconing of the rotor blades prior to spin-up, blade synchronization in the initial spin-up of the rotor during the early stages of flight and controlling the rotor speed as the suspended vehicle is decelerated to its descent rate. These problems are recognized in U.S. Pat. No. 3,838,940 to Hollrock which discloses in one embodiment a rotor structure which utilizes a torsional spring member which initially spreads the blades from the stowed to flight positions. The patented rotor also employs a flap-to-pitch coupling arrangement provided by unique hinges which aid in controlling rotor speed at the design level. An explosively separable cable interconnects the blade links to restrain the spreading motion of the links so that the coning angle of the blades is limited to an angle no less than a preselected value. After the vehicle has been decelerated by a predetermined desired amount, the cable is severed and rotor speed regulation is terminated.

SUMMARY OF THE INVENTION

Accordingly, it is an object of the present invention to provide a deployable rotor which will positively precone the rotor blades during initial deployment. Another object of the invention is to accurately synchronize coning of the rotor blades during initial spin-up and flight. A further object of the present invention is to more accurately provide for rotor speed governing during all stages of flight. Yet another object of the present invention is to provide a rotor which will spin-up to operating speed after deployment and then continue to operate at its optimum performance level for autorotation or autogyration in a terminal phase of flight.

Briefly, these and other objects are accomplished by a deployable stowed rotor having a rotor hub to which a pair of telescoping rotor blades are connected and which is foldable into a small package suitable for stowage prior to use. When the rotor is deployed, for example, as a lifting device for an ejection seat or space capsule, positive preconing of the blades is provided by a spreading link arrangement connected to a drogue chute which causes the blades to precone to a predetermined angle. Coning during initial deployment and rotor spin-up is synchronized by intermeshed gears provided by gear sectors at respective one ends of the blades attached to the hub by teeter link hinges. Rotor speed is automatically regulated by a governing spring formed in conjunction with a helical spline arrangement between each of the blades and the hub and which varies the pitch of the spinning blades to increase or decrease rotational velocity thereby to maintain rotor design speed.

For a better understanding of these and other aspects of the invention, reference may be made to the following detailed description taken in conjunction with the accompanying drawings.

BRIEF DESCRIPTION OF THE DRAWINGS

FIG. 4 is a magnified elevation view of a portion of the rotor shown in FIG. 3;

FIG. 5 is a top view of the portion of the rotor as shown in FIG. 4;

FIG. 6 is a sectional view of the deployable rotor as viewed along the sectioning line 6—6 in FIG. 5;

FIG. 7 is an elevation view of the deployable rotor as viewed along the line 7—7 shown in FIG. 6;

FIG. 8 is a sectional view of the deployable rotor viewed along the sectioning line 8—8 in FIG. 6;

DESCRIPTION OF THE PREFERRED EMBODIMENT

Figure 1:
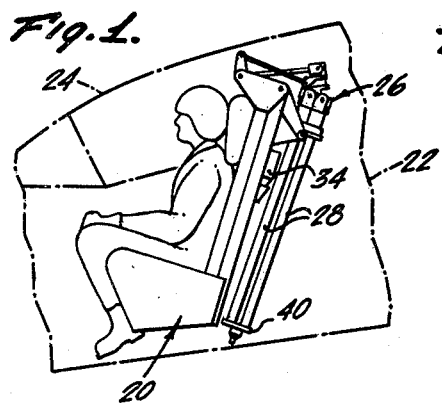
FIGS. 1 and 1A show an ejection seat vehicle incorporating the deployable rotor of the present invention.

Although the deployable rotor of the present invention can be utilized with many bodies requiring descent rates, the rotor is shown in the drawings as it would be employed in an aircraft ejection seat vehicle.

Figure 2:
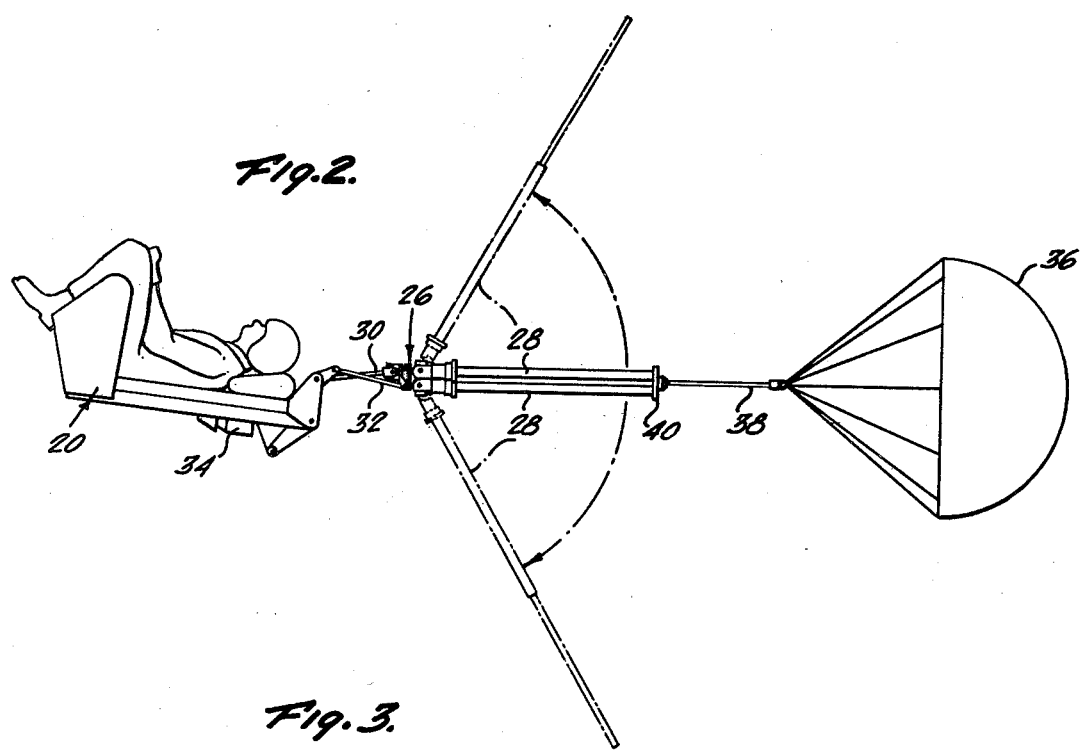
FIG. 2 shows the ejection seat vehicle of FIG. 1 during the deceleration and spin-up phase of flight.
Figure 3:
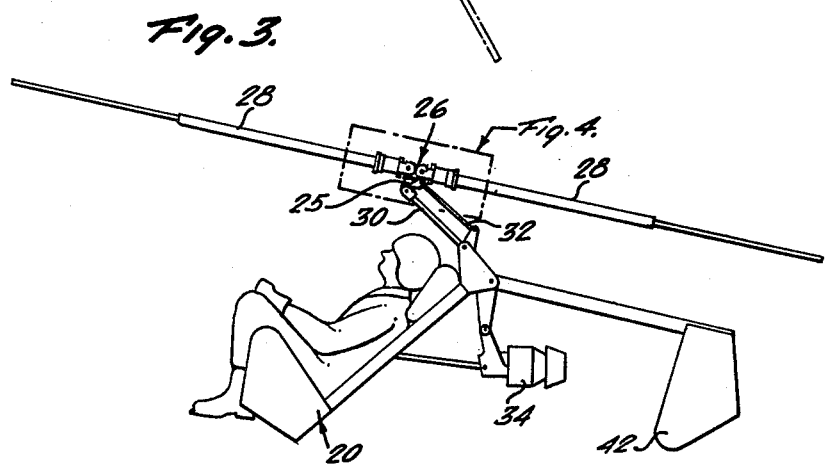
FIG. 3 shows the ejection seat vehicle during the autogyro phase of flight with the rotor fully deployed.

FIGS. 1-3 show the deployable rotor of the present invention in different configurations assumed sequentially as an ejection seat, generally designated 20 which is expelled from an aircraft 22 shown in fragmentary fashion in FIG. 1. The general sequence of events during and after ejection from the aircraft are as follows.

Figure 1A:
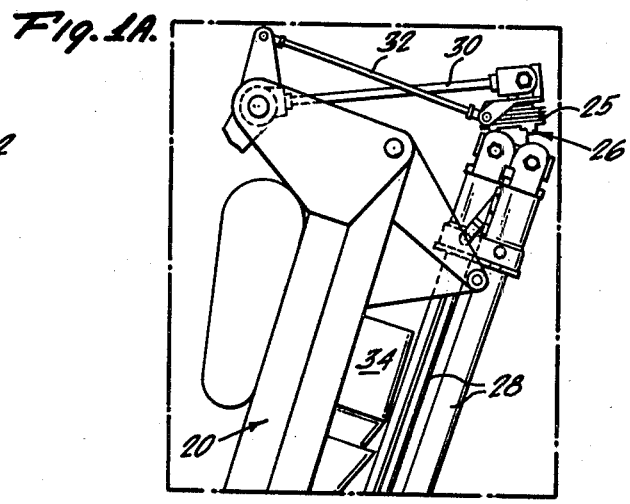

In FIG. 1, the canopy 24 over the cockpit of the aircraft is blown or pushed off and the ejection seat 20 is expelled upwardly from the cockpit. The deployable rotor, generally designated 26, is held in its stowed position with two rotor blades 28 folded at the rear of the seat 20. FIG. 1A more clearly discloses further details of the ejection seat and rotor hub shown in FIG. 1. A hub 25 is primarily connected to and supported from the seat 20 by a main support mast 30. The hub 25 is also tilted or steered in a manner which will be discussed with greater detail hereinafter by a pair of control rods 32 of which only one is shown. A thrust motor 34 is conveniently packaged to the rear of the seat 20 and positioned in a recess therewith.

When the seat has been completely ejected and cleared the aircraft, a drogue chute 36 is released to begin deployment of the rotor as shown in FIG. 2. The chute 36 is connected to the rotor by means of a drag line 38 that leads from the tips of the folded blades inwardly toward the rotor 26. The rotor 26 is pivotally connected to the ejection seat 20 by means of the mast 30 so that the rotor may pivot between the stowed and deployed positions shown in the sequence 1-3. A wrap cable 40 or similar device is used to hold the distal or projecting ends of the blades 28 prior to the rotor spin-up and deceleration phase of flight. During the initial deployment phase the drogue chute 36 is activated to pull on the drag line 38. Also, the wrap cable 40 holding the rotor blades 28 packaged in parallel relationship is released in any conventional manner such as, for example, a time detonator charge to permit the blades to open as shown in phantom. After the blades have been freed of the wrap mechanism, the pull of the chute 36 on the line 38 activates a positive preconing assembly attached to the rotor hub, described with greater detail hereinafter, to cause the blades to assume a predetermined preconing angle and rotation is induced by the relative flow of air over the blades.

The rotor blades 28 shown in the phantom position in FIG. 2 are telescoping blades. Blades of this type are disclosed in greater detail in U.S. Pat. No. 3,773,433 to Hollrock. As the blades pick up speed and assume the extended positions, the rotor begins producing lift or drag to decelerate the ejection seat 20 toward a terminal descent rate. During this deceleration phase and for other future continuing phases of flight, the rotor is governed to prevent the rotor blades from acquiring excessive rotational speed. The speed control features are described in greater detail hereinbelow.

After initial deployment and during positive preconing, the blades are synchronously separated to assume the fully deployed position as shown in FIG. 3 and in which the terminal flight phase begins. Also, upon the blades 28 attaining a predetermined, desired rotational velocity, the chute 36 and line 38 are severed from the rotor hub by any conventional means such as a detonator charge. In the terminal flight phase, the pilot assumes limited control over the location of the center of gravity of the ejection vehicle relative to the thrust vector of the rotor 26 to permit maneuvering. To this end, the control rods 32 are provided to give pilot steering control from the seat to the rotor 26 and the rotor operates as an autogyro. In one type of ejection vehicle, the thrust motor 34 and a pair of vertical tail surfaces 42 are extended to provide controlled forward flight.

For a more detailed explanation and showing of the ejection seat vehicle and rotor support mechanism, reference may be had to U.S. Pat. No. 3,662,978 to Hollrock.

Referring now to FIG. 4 there is shown an elevation view of the rotor as fully deployed. Each of the blades 28 is attached at their respective rotor ends to a splined inner barrel assembly 44a, 44b. The splines, which will be shown with greater detail hereinafter, are helically positioned and engaged in registration with the splined inner surface of corresponding outer barrel assemblies 46a, 46b which slidingly cover and engage the splines in the inner barrel assemblies. Each of the outer barrel assemblies 46 has formed at respective one ends thereof a gear sector 48a, 48b which operatively engage each other during the initial stages of preconing and rotor spin-up to provide for blade coning synchronization. Each of the gear sectors 48 are correspondingly attached to a rectangular teeter link 50 by corresponding blade flapping pins 52, 54. As a safety precaution to prevent catastrophic failure of the rotor system, a pair of blade retention safety pins 55 are respectively secured to predetermined positions within each of the inner barrels 44 so as to registeringly engage with corresponding rectangular slots formed within each of the outer barrel assemblies 46. The teeter link 50 is hingingly connected to the hub 25 by a bolt 56. A pair of displaceable teeter stops 58 are each secured to the hub 25 by a bolt 60. Each of the stops 58 are urged in place underneath and adjacent the gear sectors 48 by respective springs 62. A plurality of slip rings 64 are formed around the hub 25 and are used to communicate electrical signals between the ejection seat and the rotor 26. Beneath the slip rings 64 and in coaxial alignment therewith is a ring gear 68. A spindle assembly 70 is connected to the center of the hub 25 by a bearing assembly which will be shown in greater detail hereinafter and which provides rotational support for the hub and the blade assemblies. Attached to the spindle assembly at one side thereof is an rpm sensor 72 having an input gear 74 operatively meshed with the ring gear 68 secured to the hub. A bracket is formed at the bottom of the spindle assembly 70 to provide support for a universal joint having a spider member 76 at the center thereof. The spider 76 provides a universal rotation connection between the spindle assembly 70 and the mast 30.

The end portion of the drag line 38 is shown threadingly connected to the top of a forked chute lanyard 78. The prong members of the lanyard 78 operatively engage within the outside prong members of a forked slide 80 having slots milled in each of the respective prongs thereof. Intermediate the prongs of the lanyard 78 and operatively connected by a bolt 82 to the prongs of both the slide and the lanyard are a pair of spreader links 84a, 84b each having open slots formed in the respective distal ends thereof. The shank of the slide 80 forms a bolt at the lower end thereof and is operatively connected to the approximate center of the bolt 56. Engaging and surrounding the shank end of the slide 80 is an explosive device 86 which, when actuated, is designed to sever the slide from the bolt 56.

Referring now to FIG. 5 there is shown a top view of the rotor of the present invention in its fully deployed position. More clearly shown is the teeter link 50 hinged about the hub 25 by the bolt 56. The gear sectors 48a, 48b of the outer barrel assemblies hinge, respectively, about the pins 52 and 54. Both of the control rods 32 are shown connected to the spindle assembly 70 and an elevation view of which was noted in FIG. 4. The safety pins 55 are shown retaining the respective pairs of inner and outer barrel assemblies. The barrel assemblies 46a, 46b are spatially displaced in relation to each other by the teeter link 50 so as to provide for convenient folding and stowage when the blades 28 are placed parallel to one another.

Referring now to FIG. 6, there is shown a side elevation sectional view of the rotor in the deployed position taken along the sectioning line 6—6 noted in FIG. 5. More clearly shown is a rod end 88 threadingly connected to the shank of the slide 80 so as to rotatably attach the slide about the center of the bolt 56. Also shown in greater detail is the attachment of the hub 25 to the spindle 70 by a plurality of bearings 90 positioned within respective races formed between the hub and the spindle. The hub is further secured to the spindle assembly 70 by a hub bolt 92 and washer 93. Speed governing control of the rotor, which will be described with further detail hereinafter, is accomplished by means of mating helical splines formed on the outer surface of the inner barrel assembly 44a,b and the inner surface of the outer barrel assembly 46a,b. A fragmentary portion of the inner barrel assembly 44b splines are shown in the drawing at the hub end of the barrel assembly. In this particular embodiment, the helix has a right hand twist with an angle of approximately 20° per inch of twist. A cylindrical spring assembly is formed within the hollow recess of each of the inner barrel assemblies 44 and comprises an alternating series of rigid rings 94, such as formed from metallic plates, and compressible rubber rings 96. The circular plates and rings 94, 96 are coaxially centered and positioned by a spring retainer 98 threadingly engaged at one end thereof to the outer barrel assembly and having a capped other end of a sufficient diameter to restrain one end of the spring assembly. The other end of the spring assembly is secured in relation to the inner barrel assembly 44b by a threaded retainer nut 100 which threadingly engages the inner surface of the inner barrel assembly 44b and which serves to support and retain the spring assembly between the inner and outer barrels. The helical splines of the outer barrel assembly are arranged to engage mating splines formed on the inner barrel assembly so that as the centrifugal rotating force pulls in the blades 28 outwardly from the hub 25, the blades increase pitch and compress the respective spring assemblies 94, 96 held between the inner and outer barrel pairs.

Referring now to FIG. 7 there is shown an elevation view of the preconing mechanism as used in conjunction with the rotor of the invention. More clearly shown is the forked chute lanyard 78 having an opening between the prongs thereof which opening has placed therein and at the bottom thereof the pair of spreader links 84a, 84b. Also shown in greater detail is the slide 80 having a pair of prongs engaging the outer surfaces of the lanyard 78 and having the bolt 82 securing the entire mechanism so as to move within the slots provided by the slide.

Referring now to FIG. 8 there is shown a sectional view of the barrel assemblies of one side of the rotor as viewed along the sectioning line 8—8 shown in FIG. 6. More clearly shown is the spline arrangement wherein the inner barrel assembly 44b is shown having a plurality of outwardly projecting splines registering with the splined inner surface of the outer barrel assembly 46b. Central to the splines and shown in increasing radial order is the spring retainer 98, a rubber ring 96 and a plate 94 portion of the spring assembly.

Figure 9:
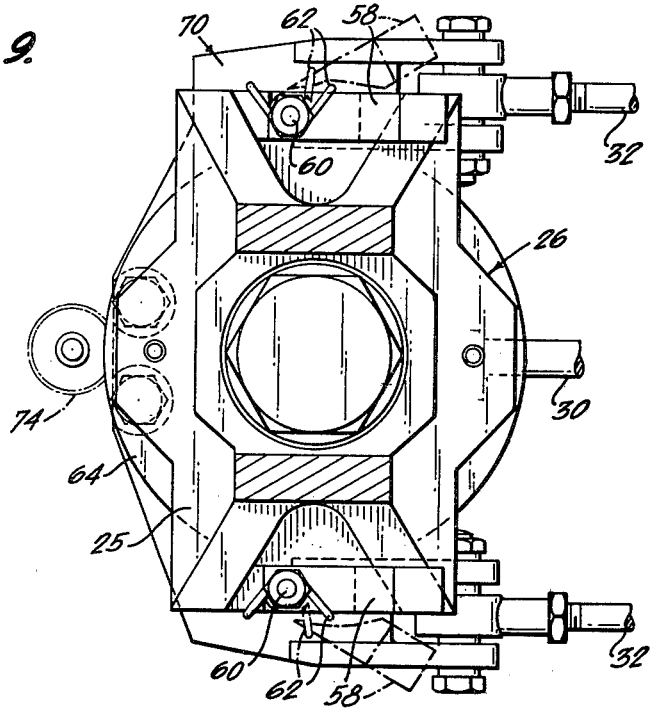
FIG. 9 is a top sectional view of the spindle assembly and hub portion of the deployable rotor as viewed along the sectioning line 9—9 of FIG. 6.

Referring now to FIG. 9 there is shown a top sectional view of the spindle assembly 70 and hub 25 as viewed along the sectioning line 9—9 noted in FIG. 6. More clearly shown is the relationship of the control rods 32 to the spindle assembly 70 so as to cause the pivoting of the spindle and consequently the hub according to the forces applied to each of the rods 32. Also more clearly shown is the relationship of the teeter stops 58 to the hub. During the fully deployed phase of flight, the teeter stops are forced into the position as shown by the effect of the springs 62 mounted about the respective bolts 60. For stowage, however, the teeter stops 58 may be manually displaced to positions shown in the phantom views so as to allow more compact stowage of the blades.

Figure 10:
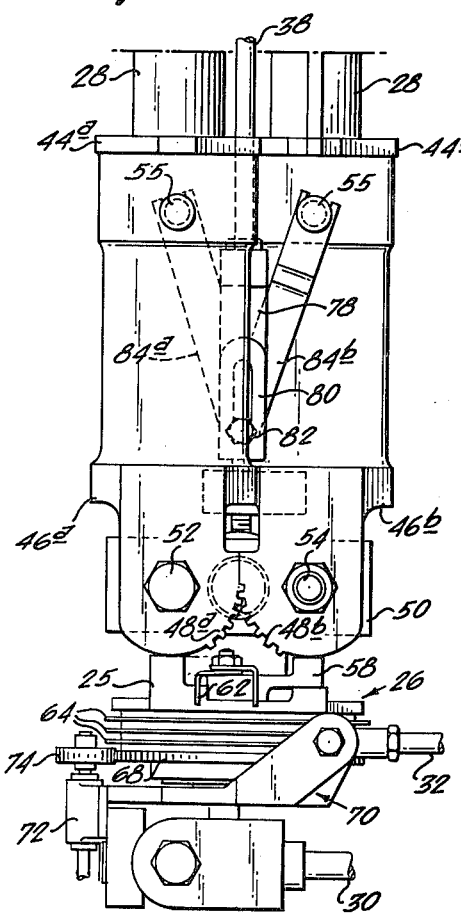
FIG. 10 is an elevation view of the deployable rotor with the rotor blades folded in a parallel relationship maintained during stowage and the early phases of deployment with teeter stops engaged.

Referring now to FIG. 10, the blades 28 are shown folded in parallel relationship either for stowage or during the deceleration phase of flight. In this position, the teeter stops 58 are shown in the engaged position and in contact with the bottom surface of the non-geared area of the sector 44b. There is no clearance available between the stop 58 and the geared sectors 44 thereby restraining the sectors from teetering and maintaining the blades in an essentially parallel relationship with the axis of the hub 25. Also to be noted is the already initiated intermeshing of the sectors 44a and 44b so as to insure absolute synchronization during the coning of the blades. Each of the outer barrel assemblies 46a, 46b utilizes one of the safety pins 55 thereon to engage the open ended slots of the respective spreading links 84a, 84b. In the folded position as shown the spreading links, while engaging each of the pins 55, will force the bolt 82 to be positioned within the bottommost portion of the slots provided in the slide 80.

Figure 11:
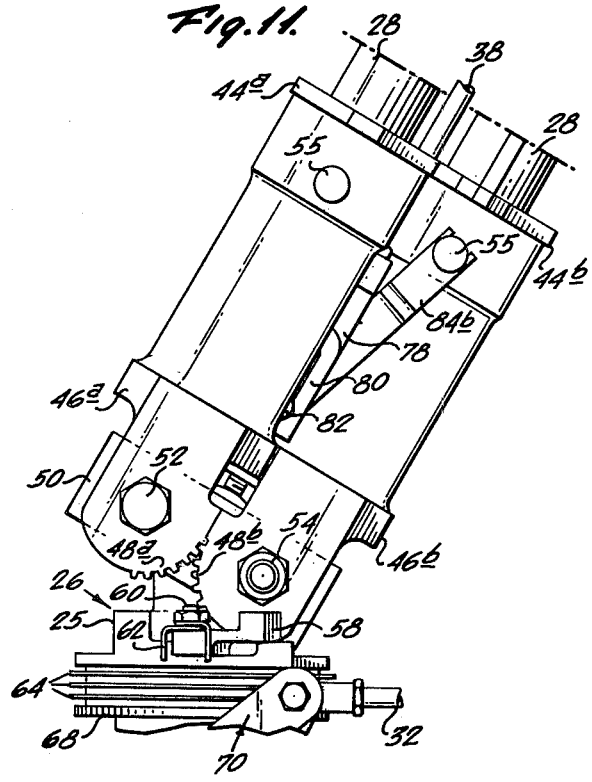
FIG. 11 is an elevation view of the deployable rotor with the rotor blades folded in the parallel relationship maintained during stowage with the teeter stops disengaged.

Referring now to FIG. 11, there is shown an elevation view of the folded blades 28 in a stowed position with the teeter stops 58 disengaged. By manually pulling the stops 58 from the center of the hub 25 against the force of the respective springs 62, the folded blades and intermeshed barrel assemblies are allowed to be displaced at an acute angle to the axis of the hub thereby swinging the folded blades to one side and allowing for more compact stowage in this position.

Referring now to FIGS. 1, 1A, 10 and 11, the operation of the invention in the initial stages of deployment will now be described. Prior to ejection from the aircraft 22, the ejection seat 20 serves to stow behind the frame thereof the folded blades 28, the rotor 26, the thrust motor 34 and other associated deployment mechanisms such as the chute 36. The rotor and blades may be most efficiently stowed in a given application by a displacement of the teeter stops 58 from the bottom of the geared sectors 44 as shown in FIG. 11. Even though displaced from the sectors 44, the stops 58 will have a tendency to reengage underneath the sectors due to the pressure provided by the respective springs 62. FIG. 10 illustrates a partial deployment of the folded blades during the initial deceleration stage of flight. This stage occurs after ejection from the aircraft and with the folded blades being pulled back by the action of the opening of the drogue chute 36 through the line 38 thereby placing the folded blades in parallel alignment with the hub axis. This alignment is further facilitated by the teeter stops 58 being pulled into engagement underneath the gear sectors 44 and thus preventing teetering of the folded blades from the hub axis.

As shown in FIG. 2 the parachute is deployed in the deceleration phase of flight during which and at a predetermined amount of time, the wrap cable 40 is severed in any convenient manner such as by explosive charge to allow the distal ends of the blades 28 to begin to separate. Positive preconing of the blades is initiated immediately after severance of the wrap cable by the application of drag force on the line 38 which is connected to one end of the chute lanyard 78. By pulling on the lanyard, the bolt 82 is drawn outwardly along the slots provided in the slide 80 thereby causing the links 84a, 84b to concomitantly spread open at the distal ends thereof. The distal ends of the links 84 each engage, respectively, one of the outer barrel assemblies 46 so as to cause the barrel assemblies to spread apart in accordance with displacement of the bolt 82 in the slide. During the positive preconing operation, each of the geared sectors 44 meshes with the other so as to provide synchronized separation between them. Aerodynamic forces acting on the separated blades develop a rotational torque and the rotor begins to spin. As the rotational speed of the rotor increases, centrifugal forces also spread the blades to decrease coning angles and permit the telescoping blade sections to extend. Therefore, for the purposes of this Specification a coning angle is defined as the angle between a blade and plane perpendicular to the axis about which the blade rotates. The spreader links 84a, 84b disengage from the safety pins 55 at a predetermined coning angle by means of the open slot engagement provided between the distal ends of the links and the respective safety pin. When blade coning has decreased, for example, to approximately 30°, geared synchronization of coning and teeter restraint are released. That is, the gear engagement provided by the meshing of gear sectors 44 runs out and clearance is established between the smooth portions of the gear sectors and the teeter stops, even though at this point the teeter stops remain fully engaged. These phases of initial spin-up and rotor deployment are better illustrated in FIGS. 2 and 3 which sequentially note the continuing phases of flight deployment. When the rotor is up to speed, the chute lanyard 78 and spreader links 84 are jettisoned from the rotor by means of the explosive device 86 shown in FIG. 4. The jettisoning may be most conveniently accomplished by sampling the speed of the hub 25 by the rotating ring gear 68 turning the input gear 74 of the rpm sensor 72. At a predetermined rpm indicative of the rotor having achieved design speed, the sensor 72 provides an output signal which is communicated to the explosive device 86 by means of the slip rings 64 provided on the rotor hub 25. The slip rings 64 may also be used to communicate additional electrical signals such as, for example, the detonating signal used to separate the wrap cable 40. At operational design speed, the rotor system is permitted to teeter about the center line axis provided within the bolt 56 and each of the blades 28 flap independently about their respective pin axis provided by respective blade flapping pins 52, 54. The degree to which each of the flapping blades may digress is noted in FIG. 4 by the phantom lines shown placed under the assembly 46b and sector 48b. This deployed configuration as graphically illustrated in FIG. 3 is well suited for autogyro mode operation after deceleration and transition of the ejection seat. The pilot exercises maneuverability and control over the deployed rotor by means of applying forces on the control rods 32 and activation of the thrust motor 34.

Rotor speed regulation is accomplished by the splined barrel interrelationship and associated spring assembly illustrated in FIG. 6. The governing spring earlier noted as comprising alternating sections of circular plates 94 and compressible rubber rings 96 may, in alternate embodiments, be either completely metallic or elastomeric. As the rotor speed tends to increase, centrifugal forces applied to each of the blades also increase. In normal operation, these forces are used to good effect in order to extend and telescope the blades. Under abnormal or nondesign speed velocities, the increased loading provided by increased centrifugal forces permits the blades to move outwardly from the hub in registration with the splines thereby compressing the governing spring. The motion of the inner barrel assembly relative to the outer barrel assembly increases blade pitch by means of the helical spline engagement. The spline lead is designed to be insensitive or irreversible to blade pitching moment. The increasing blade pitch will halt further rotor speed increases and maintain rpm at the design norm. If rotor speed decreases below the design norm, the spring assembly is unloaded and reverse action occurs to decrease blade pitch and thereby speed up the rotor. The spring preload and spring rate are preselected to give the desired governed speed and governing sensitivity. The spring retainer 98 is the prime blade retention member and serves under normal operating conditions to maintain the inner and outer barrel assemblies in contact with one another. The blade retention safety pins 55, as shown in FIG. 4, provide backup safety stops in the event of abnormally high rotor speed increases. Should the spring retainer 98 fail, the particular blade or blades affected move to a high pitch position against the blade retention safety pins 55 which stop the outward twisting motion and retain the blade with the rotor while decreasing rotor speed due to the increased pitch.

Thus it may be seen that there has been provided a novel deployable rotor which provides positive preconing and deploying of rotor blades, accurate synchronization during coning of the blades and a rotor speed governing control which operates to limit the rotational speed of the rotor to design norms during all stages of flight.

Obviously, many modifications and variations of the invention are possible in light of the above teachings. It is therefore to be understood that within the scope of the appended claims the invention may be practiced otherwise than as specifically described.

What is claimed is:

1. A speed control device for a rotatable blade mounted on a rotor hub, comprising in combination:

a pair of concentrically engaged cylinders, respective ones of said cylinders formed to be connected to the rotor hub and the blade for rotation therewith, one cylinder sliding over the other within a splined helix formed therebetween, said helix guiding the rotating blade to an increased pitch angle upon the application of centrifugal force thereto; a governing spring coaxially mounted throughout the entire length thereof within said cylinders for applying a predetermined amount of force therebetween and for uniformly compressing upon the application of centrifugal force thereto, said spring being formed of a series of alternating rubber rings and rigid plates to selectively vary the amount of pitch imparted to the blade; and retaining means formed between each of said engaged cylinders and connected to said spring for retaining said cylinders in engagement and for compressing said spring therebetween;

whereby the varying pitch angle of the blade controls the rotational speed thereof.

2. A speed control device according to claim 1 wherein said pair of cylinders include an inner cylinder and an outer cylinder, said inner cylinder having a smaller diameter than said outer cylinder, each of said cylinders being closed at one end and open at the respective other ends for sliding engagement thereof.

3. A speed control device according to claim 1 wherein said retaining means further comprises:

an elongated retaining member formed along the common cylindrical axis inside said engaged cylinders, said retaining member being connected at one end to the center of the closed end of said outer cylinder and having a cap formed at the other end perpendicular to said cylindrical axis, said elongated member passing through the opening in said spring means and said cap restraining the movement of one end of said spring means on said member; and an annular member slidably engaged at the center thereof with said elongated retaining member and attached at the outer circumference thereof to the open end of said inner cylinder for restraining the movement of the other end of said spring means on said member, said annular member compressing said spring means against said retaining member cap during the disengagement of said cylinders.

4. A speed control device according to claim 1 further comprising means formed between said engaged cylinders for safely limiting the amount of disengagement thereof upon failure of said force exerting means to maintain said cylinders in engagement.

* * * * *